(12) United States Patent
Yokoyama

(10) Patent No.: US 9,386,262 B2
(45) Date of Patent: Jul. 5, 2016

(54) IMAGE PROCESSING METHOD, IMAGE PROCESSING APPARATUS AND IMAGE PICKUP APPARATUS

(71) Applicant: CANON KABUSHIKI KAISHA, Tokyo (JP)

(72) Inventor: Takayoshi Yokoyama, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 55 days.

(21) Appl. No.: 13/923,901

(22) Filed: Jun. 21, 2013

(65) Prior Publication Data

US 2013/0342732 A1  Dec. 26, 2013

(30) Foreign Application Priority Data

Jun. 22, 2012 (JP) .................. 2012-140646

(51) Int. Cl.
*H04N 5/907* (2006.01)
*H04N 5/357* (2011.01)
*G06T 5/00* (2006.01)

(52) U.S. Cl.
CPC .............. *H04N 5/907* (2013.01); *G06T 5/003* (2013.01); *G06T 5/006* (2013.01); *H04N 5/3572* (2013.01)

(58) Field of Classification Search
CPC ...... H04N 9/646; H04N 5/3572; G06T 5/003; G06T 5/006
USPC ......................................... 348/335–344, 241
See application file for complete search history.

(56) References Cited

U.S. PATENT DOCUMENTS

2011/0193997 A1* 8/2011 Hatakeyama ............. 348/241
2014/0028839 A1* 1/2014 Ishibashi ................... 348/140
2014/0184859 A1* 7/2014 Sakita et al. ............... 348/241

FOREIGN PATENT DOCUMENTS

| JP | 2004-239962 A | 8/2004 |
| JP | 2005-509333 A | 4/2005 |
| JP | 2011-044825 A | 3/2011 |
| JP | 2011-199407 A | 10/2011 |

OTHER PUBLICATIONS

Japanese Office Action dated Aug. 5, 2014 issued in counterpart Japanese Application No. 2012-140646.

* cited by examiner

*Primary Examiner* — Tuan Ho
(74) *Attorney, Agent, or Firm* — Rossi, Kimms & McDowell LLP

(57) ABSTRACT

The image processing method disclosed includes acquiring an input image produced by image capturing through an image capturing optical system, storing image restoration filters to be used for an image restoration process to a memory, acquiring information showing an image capturing state that is a state of the image capturing optical system for the image capturing, and determining whether or not to perform the image restoration process on the input image depending on the image capturing state. The method further includes acquiring the image restoration filter corresponding to the image capturing state from the memory only when a determination to perform the image restoration process is made, and performing the image restoration process on the input image by using the acquired image restoration filter.

16 Claims, 12 Drawing Sheets

IMAGE PROCESSING METHOD, IMAGE PROCESSING APPARATUS AND IMAGE PICKUP APPARATUS

BACKGROUND OF THE INVENTION

1. Field of the Invention

The present invention relates to an image processing technique for performing an image restoration process to correct (reduce) a degraded component of an image produced by image capturing through an image capturing optical system.

2. Description of the Related Art

Captured images produced by image pickup apparatuses such as digital cameras include a blur component that is an image degradation component caused by various aberrations of an image capturing optical system (hereinafter simply referred to as "an optical system") such as spherical aberration, comatic aberration, field curvature and astigmatism. Such a blur component is generated because a light flux emitted from one point of an object forms an image with some divergence on an image pickup surface of an image sensor, the light flux being normally converged at one point if there is no aberration or diffraction.

The blur component herein is optically expressed as a point spread function (PSF), and is different from blur caused by defocusing. Moreover, color blur in a color image generated due to longitudinal chromatic aberration, chromatic spherical aberration or chromatic comatic aberration of the optical system can be said to be a difference between blurring degrees of respective light wavelengths. Moreover, lateral color shift caused by chromatic aberration of magnification of the optical system can be said to position shift or phase shift due to difference of image capturing magnifications for respective light wavelengths.

Fourier transform of the point spread function (PSF) provides an optical transfer function (OTF) showing frequency component information on aberration and being expressed by a complex number. An absolute value of the optical transfer function (OTF), that is, an amplitude component is called a modulation transfer function (MTF), and a phase component is called a phase transfer function (PTF). The MTF and PTF respectively show frequency characteristics of amplitude and phase components of image degradation due to aberration. In the following description, the phase component is expressed as a phase angle by the following expression where Re(OTF) and Im(OTF) respectively represent a real part and an imaginary part of the OTF.

$$PTF = \tan^{-1}[Im(OTF)/Re(OTF)]$$

As described above, the optical transfer function (OTF) of the optical system provides degradation to the amplitude and phase components of the image, so that the degraded image includes, at each point of the object, asymmetric blur like comatic aberration.

Moreover, the chromatic aberration of magnification is generated by separately capturing images of color components such as R, G and B, whose imaging positions are mutually shifted due to differences of imaging magnifications for the respective light wavelengths, depending on spectral characteristics of the image pickup apparatus. The imaging magnification differences for the respective light wavelengths cause not only the shift of the imaging positions among the color components, but also shift of imaging positions of respective wavelengths in each of the color components, that is, image spread due to the phase shift. Thus, although, exactly, the chromatic aberration of magnification is not mere a parallel color shift, the following description treats the color shift as being equivalent to the chromatic aberration of magnification.

As a method for correcting such degradation of the amplitude component (MTF) and degradation of the phase component (PTF) in the degraded image (input image), there is known a method using information on the optical transfer function (OTF) of the optical system. This method is referred to as "image restoration" or "image recovery", and a process for correcting the degraded image by using the information on the optical transfer function (OTF) of the optical system is hereinafter referred to as "an image restoration process (or simply, a restoration process)". As one of the image restoration processes, a convolution method that performs convolution of an image restoration filter having an inverse characteristic to the optical transfer function on the input image in a real space. Japanese Unexamined Patent Application Publication (Translation of PCT Application) No. 2005-509333 discloses a method that performs a restoration process by storing and using filter coefficients for correcting degradation of an image.

When performing image capturing with focusing on a main object, images of other objects located at different distances become defocused images. Therefore, when performing the restoration process on such defocused images, it is necessary to use image restoration filters corresponding to positions of the respective objects (that is, defocus amounts). However, using such image restoration filters corresponding to the defocus amounts increases amount of data of the image restoration filter to be provided (that is, to be stored). Moreover, performing the image restoration process also on the defocused image increases processing time. Thus, Japanese Patent Laid-Open No. 2011-044825 discloses a method that performs an image restoration process only on an in-focus area of a captured image to increase a processing speed.

Since the image restoration filter to be used for the image restoration process is a two-dimensional filter, providing image restoration filters for respective image capturing states (image capturing conditions) such as focal lengths, object distances and aperture values and image heights enormously increases amount of data to be stored. However, Japanese Unexamined Patent Application Publication No. 2005-509333 does not mention reduction of the data amount.

Moreover, when performing the image restoration on the in-focus area of the captured image, since the in-focus area is changed in each image capturing, it is necessary to provide the image restoration filters for the entire image capturing area, which makes it difficult to reduce the data amount of the image restoration filters.

BRIEF SUMMARY OF THE INVENTION

The present invention provides an image processing method, an image processing apparatus, an image pickup apparatus and a non-transitory computer-readable storage medium storing an image processing program each being capable of obtaining a good image while reducing amount of data of image restoration filters to be stored.

The present invention provides as one aspect thereof an image processing method including acquiring an input image produced by image capturing through an image capturing optical system, storing image restoration filters to be used for an image restoration process to a memory, acquiring information showing an image capturing state that is a state of the image capturing optical system for the image capturing, determining whether or not to perform the image restoration process on the input image depending on the image capturing state, acquiring the image restoration filter corresponding to the image capturing state from the memory only when a determination to perform the image restoration process is made, and performing the image restoration process on the input image by using the acquired image restoration filter.

The present invention provides as another aspect thereof an image processing apparatus including an image acquirer configured to acquire an input image produced by image capturing through an image capturing optical system, a memory to store image restoration filters to be used for an image restoration process, an image capturing state acquirer configured to acquire information showing an image capturing state that is a state of the image capturing optical system for the image capturing, a determiner configured to determine whether or not to perform the image restoration process on the input image depending on the image capturing state, and a processor configured to acquire the image restoration filter corresponding to the image capturing state from the memory only when a determination to perform the image restoration process is made and performs the image restoration process on the input image by using the acquired image restoration filter.

The present invention provides as still another aspect thereof an image pickup apparatus including an image capturer configured to perform image capturing through an image capturing optical system to produce a captured image, and the above-described image processing apparatus.

The present invention provides as yet still another aspect thereof a non-transitory computer-readable storage medium storing an image processing program to cause a computer to execute an image process. The image process including a step of acquiring an input image produced by image capturing through an image capturing optical system, a step of storing an image restoration filter to be used for an image restoration process to a memory provided inside or outside the computer, a step of acquiring information showing an image capturing state that is a state of the image capturing optical system for the image capturing, a step of determining whether or not to perform the image restoration process on the input image depending on the image capturing state, a step of acquiring the image restoration filter corresponding to the image capturing state from the memory only when a determination to perform the image restoration process is made, and a step of performing the image restoration process on the input image by using the acquired image restoration filter.

Other aspects of the present invention will be apparent from the embodiments described below with reference to the drawings.

DETAILED DESCRIPTION OF THE PREFERRED EMBODIMENTS

Figure 1:
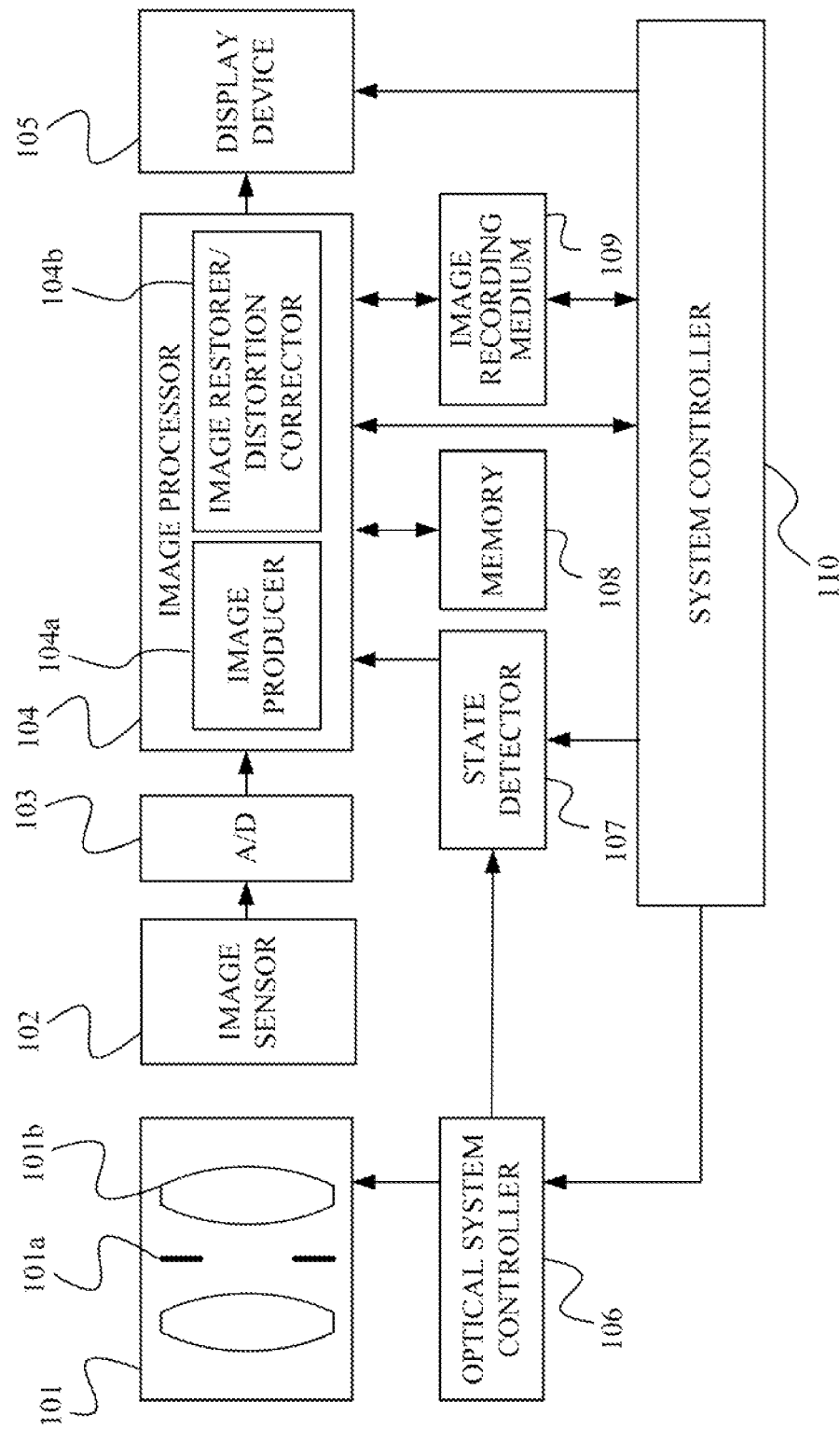
FIG. 1 is a block diagram showing a configuration of an image pickup apparatus provided with an image processing apparatus that is Embodiment 1 of the present invention.

Exemplary embodiments of the present invention will be described below with reference to the accompanied drawings.

First of all, prior to description of specific embodiments, description will be made of definition of terms to be used in the embodiments and an image restoration process performed in the embodiments.

"Input Image"

The input image is a digital image produced by image capturing performed by an image pickup apparatus, that is, by using output from an image sensor photoelectrically converting an object image formed by an image capturing optical system. The digital image is degraded according to an optical transfer function (OTF) including information on aberrations of the image capturing optical system constituted by lenses and various optical filters. The image sensor is constituted by a photoelectric conversion element such as a CCD sensor or a CMOS sensor. The image capturing optical system may be constituted by reflective surfaces such as mirrors each having curvature. Moreover, the image capturing optical system may be detachably attachable (interchangeable) to the image pickup apparatus. In the image pickup apparatus, the image sensor and a signal processor that produces the digital image (input image) by using the output from the image sensor constitute an image capturing system.

The input image has information on color components such as R, G and B components. The color components can be also expressed by, other than the RGB, an optionally selected one of general color spaces such as LCH (lightness, chroma and hue), YCbCr (luminance, blue color difference and red color difference), XYZ, Lab, Yuv and JCh, or can be expressed by color temperature.

The input image and a restored image (output image) can be provided with information on an image capturing condition in the image pickup apparatus at a time of producing the input image. The image capturing condition includes a focal length, an aperture value, an image capturing distance (in-focus object distance) and the like of the image capturing optical system. The information on the image capturing condition is hereinafter referred to as "image capturing condition information". In addition, the input image can be provided with various correction information to be used for correction of the input image. When outputting the input image from the image pickup apparatus to an image processing apparatus separated therefrom and performing the image restoration process in the image processing apparatus, it is desirable to add the image capturing condition information and the correction information to the input image. The image processing apparatus can receive the image capturing condition information and the correction information from the image pickup apparatus not only by addition to the input image, but also through direct or indirect communication and through a storage medium detachably attachable to these apparatuses.

"Image Restoration Process"

The outline of the image restoration process is as follows. When $g(x,y)$ represents an input image (degraded image), $f(x,y)$ represents a non-degraded original image, $h(x,y)$ represents a point spread function (PSF) that forms a Fourier pair with the optical transfer function (OTF), * represents convolution, and $(x,y)$ represents coordinates (position) in the input image, the following expression is established:

$$g(x,y)=h(x,y)*f(x,y)$$

Converting the above expression into a form of a two-dimensional frequency surface through Fourier transform provides the following expression of a form of a product for each frequency:

$$G(u,v)=H(u,v)\cdot F(u,v)$$

where H represents a result of the Fourier transform of the point spread function (PSF), in other words, the optical transfer function (OTF), G and F respectively represent results of the Fourier transform of g and h, and $(u,v)$ represents coordinates on the two-dimensional frequency surface, in other words, a frequency.

Dividing both sides of the above expression by H as below provides the original image from the degraded image produced by the image pickup apparatus:

$$G(u,v)/H(u,v)=F(u,v)$$

Returning $F(u,v)$, that is, $G(u,v)/H(u,v)$ to a real surface by inverse Fourier transform provides a restored image equivalent to the original image $f(x, y)$.

When R represents a result of the inverse Fourier transform of $H^{-1}$, performing a convolution process for an image in the real surface as represented by the following expression also enables provision of the original image:

$$g(x,y)*R(x,y)=f(x,y)$$

This $R(x,y)$ in the above expression is an image restoration filter. When the input image is a two-dimensional image, the image restoration filter is generally also a two-dimensional filter having taps (cells) each corresponding to each of pixels of the two-dimensional image. Moreover, increase of the number of the taps (cells) in the image restoration filter generally improves image restoration accuracy, so that a realizable number of the taps is set depending on requested image quality, image processing capability, aberration characteristics of the image capturing optical system and the like.

Since the image restoration filter needs to reflect at least the aberration characteristics, the image restoration filter is different from a conventional edge enhancement filter (high-pass filter) or the like having about three taps in each of horizontal and vertical directions. The image restoration filter is produced based on the optical transfer function (OTF) including the information on aberrations, which can highly accurately correct degradation of amplitude and phase components of the degraded image (input image).

Moreover, since an actual input image (degraded image) includes a noise component, use of an image restoration filter produced from the complete inverse number of the optical transfer function (OTF) as described above not only restores the degraded image, but also significantly amplifies the noise component. This is because such an image restoration filter raises a modulation transfer function (MTF), that is, an amplitude component of the image capturing optical system to 1 over an entire frequency range in a state where amplitude of the noise component is added to the amplitude component of the input image. Although the MTF corresponding to amplitude degradation by the image capturing optical system is returned to 1, power spectrum of the noise component is simultaneously raised, which results in amplification of the noise component according to a degree of raising of the MTF, that is, a restoration gain.

Therefore, the noise component included in the input image makes it impossible to provide a good restored image as an image for appreciation. Such raising of the noise component is shown by the following expressions where N represents the noise component:

$$G(u,v)=H(u,v)\cdot F(u,v)+N(u,v)$$

$$G(u,v)/H(u,v)=F(u,v)+N(u,v)/H(u,v).$$

As a method for solving such a problem, there is known, for example, a Wiener filter expressed by the following expression (1), which controls image restoration degree according to an intensity ratio (SNR) of an image signal and a noise signal.

$$M(u, v) = \frac{1}{H(u, v)} \frac{|H(u, v)|^2}{|H(u, v)|^2 + SNR^2} \quad (1)$$

In the above expression (1), $M(u,v)$ represents a frequency characteristic of the Wiener filter, and $|H(u,v)|$ represents an absolute value (MTF) of the optical transfer function (OTF). This method decreases, at each frequency, the restoration gain as the MTF is lower, in other words, increases the restoration gain as the MTF is higher. The MTF of general image capturing optical systems is high on a low frequency side and low on a high frequency side, so that the method resultantly suppresses the restoration gain on the high frequency side of the image signal.

Figure 4A:
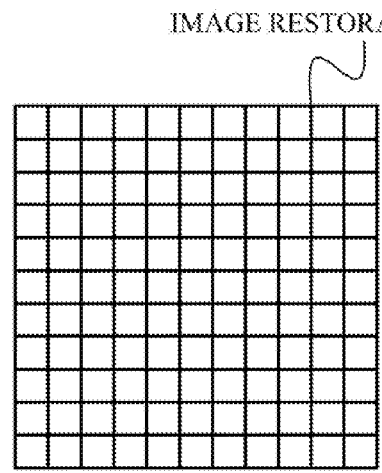
FIGS. 4A and 4B show an image restoration filter to be used in the image restoration process in Embodiment 1.
Figure 4B:
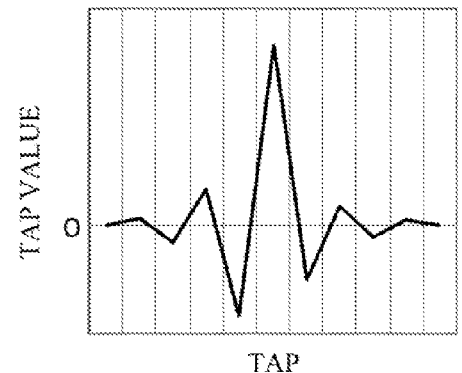

An example of the image restoration filter is shown in FIGS. 4A and 4B. For the image restoration filter, the number of the taps (cells) is decided according to aberration characteristics of the image capturing optical system and required image restoration accuracy.

The image restoration filter shown in FIG. 4A is a two-dimensional filter having 11×11 taps. Although FIG. 4A omits values (coefficient values) in the respective taps, FIG. 4B shows one cross section of this image restoration filter where values of the taps (hereinafter also referred to as "tap values") is shown by a polygonal line. A distribution of the tap values in the image restoration filter plays a role to return signal values (PSF) spatially spread due to the aberration to, ideally, one point.

The image restoration process performs convolution of each tap value of the image restoration filter on each pixel (corresponding to each tap) of the input image. In the convolution, in order to improve the signal value of a certain pixel in the input image, that pixel is matched to a center tap of the image restoration filter. Then, a product of the pixel signal value of the input image and the tap value (coefficient value) of the image restoration filter is calculated for each corresponding pair of the pixel in the input image and the tap of the image restoration filter, and the signal value of the pixel corresponding to the center tap of the filter is replaced by a total sum of the products.

Figure 5A:
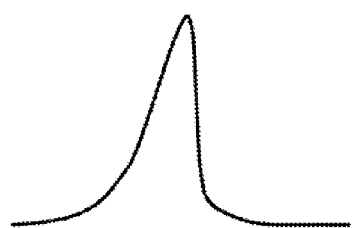
FIGS. 5A and 5B show correction of a point image by the image restoration process in Embodiment 1.
Figure 5B:
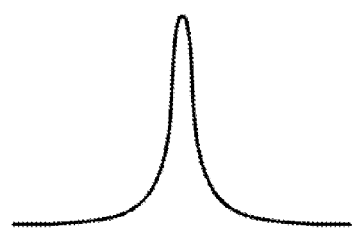
Figure 6A:
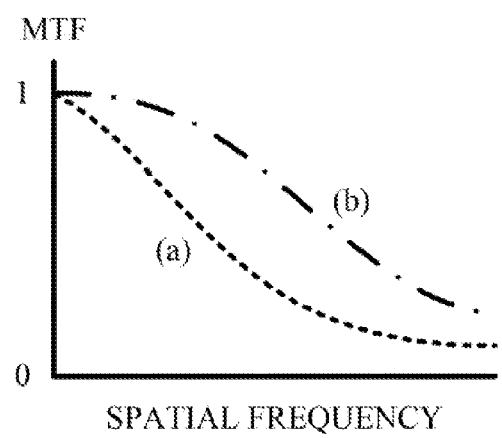
FIGS. 6A and 6B show correction of amplitude and phase by the image restoration process in Embodiment 1.
Figure 6B:
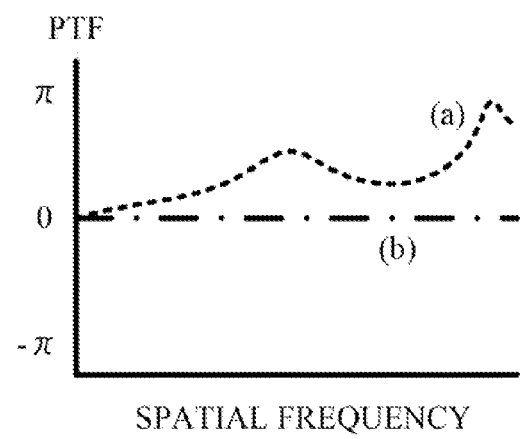

Characteristics of the image restoration in a real space and a frequency space will be described with reference to FIGS. 5A, 5B, 6A and 6B. FIG. 5A shows a PSF (point spread function) before the image restoration, and FIG. 5B shows a PSF after the image restoration. FIG. 6A shows (a) an MTF before the image restoration and (b) an MTF after the image restoration. FIG. 6B shows (a) a PTF (phase transfer function) before the image restoration and (b) a PTF after the image restoration. The PSF before the image restoration asymmetrically spreads, and the PTF changes non-linearly with frequency due to the asymmetry. The image restoration process amplifies the MTF and corrects the PTF to zero, so that the PSF after the image restoration becomes symmetric and sharp.

This image restoration filter can be obtained by inverse Fourier transform of a function designed on the basis of an inverse function of the optical transfer function (OTF) of the image capturing optical system. The image restoration filter used in the embodiments can be arbitrarily changed, and for example, the Wiener filter may be used as the image restoration filter. In the case of using the Wiener filter, the image restoration filter for the convolution on the input image in the real space can be produced by the inverse Fourier transform of the expression (1).

Moreover, since the optical transfer function (OTF) changes according to image heights (positions in the input image) even though the image capturing condition is same, the image restoration filter to be used is changed according to the image heights.

Specific embodiments of the present invention will hereinafter be described.

Embodiment 1

In FIG. 1, an image capturing optical system 101 causes light from an object (not shown) to form an object image on an image sensor 102. The image sensor 102 is constituted by a CCD sensor, a CMOS sensor or the like. The image capturing optical system 101 includes a magnification-varying lens (not shown), an aperture stop 101a and a focus lens 101b. Moving the magnification-varying lens in an optical axis direction enables zoom to vary a focal length of the image capturing optical system 101. Moreover, the aperture stop 101a increases and decreases its aperture diameter (aperture value) to control quantity of light reaching the image sensor 102. The focus lens 101b is controlled in its position in the optical axis direction by an autofocus (AF) mechanism or a manual focus mechanism, which are not shown, and thereby focusing is performed depending on an object distance.

The object image formed on the image sensor 102 is converted into an analog electric signal by the image sensor 102. An analog signal output from the image sensor 102 is converted into a digital signal by an A/D converter 103 to be input to an image processor 104.

The image processor 104 includes an image producer 104a to perform various processes on the input digital signal to produce a color input image (captured image). Moreover, the image processor 104 includes an image restorer/distortion corrector 104b to perform the image restoration process and a geometric conversion process (distortion correction process) on the input image. The image sensor 102, the A/D converter 103 and the image producer 104a constitute an image capturer. An image signal produced by the various processes is output to a display device 105 and an image recording medium 109.

The image restorer/distortion corrector 104b acquires, from a state detector 107, image capturing state information that is information showing a state of the image capturing optical system 101 (the state is hereinafter referred to as "image capturing state"). The image capturing state includes, for example, the focal length (zoom position), the aperture value (F-number) and the in-focus object distance (focus lens position) of the image capturing optical system 101. The image capturing state is also called an image capturing condition. The state detector 107 may obtain information on the image capturing state from a system controller 110 or from an optical system controller 106 that controls the image capturing optical system 101. Moreover, it is only necessary that the image capturing state includes at least one of the focal length, the aperture value and the in-focus object distance, and the image capturing state may include other parameters.

A memory 108 stores (saves) image restoration filters respectively corresponding to multiple limited image capturing states (combinations of selected focal length, aperture value and in-focus object distance), which are described later.

The image restorer/distortion corrector 104b selects and acquires, from the memory 108, one image restoration filter corresponding to the image capturing state and performs the image restoration process on the input image by using the acquired image restoration filter. The image restoration process may restore only a phase component and may provide some change to an amplitude component when noise amplification is within its permissive range.

Furthermore, the image processor 104 includes at least an arithmetic processor and a temporal memory (buffer) to perform writing and reading of image data to and from the temporal memory at each of image process steps (later described) as needed. The temporal memory may be used as the memory 108.

In addition, a configuration may be employed which stores (save), in the memory 108, filter coefficients necessary for producing the image restoration filters corresponding to the multiple limited image capturing states and produces the image restoration filter by using the filter coefficient when the image restoration filter is needed. Such a configuration in which the filter coefficients to be used for producing the image restoration filters are stored in the memory 108 is equivalent to the configuration in which the image restoration filters are stored in the memory 108. Moreover, the configuration which selects the filter coefficient corresponding to the image capturing state and produces the image restoration filter is equivalent to the configuration which acquires the image restoration filter.

On the other hand, the image restorer/distortion corrector 104b selects, from the memory 108, a geometric conversion condition corresponding to the image capturing state and performs the geometric conversion process on an image (restored image) produced by the image restoration process. The state detector 107, the image restorer/distortion corrector 104b and the memory 108 constitute an image processing apparatus provided in the image pickup apparatus. The image restorer/distortion corrector 104b serves as an image acquirer, a determiner and a processor. Moreover, the image restorer/distortion corrector 104b serves as an image capturing state acquirer together with the state detector 107.

Figure 2:
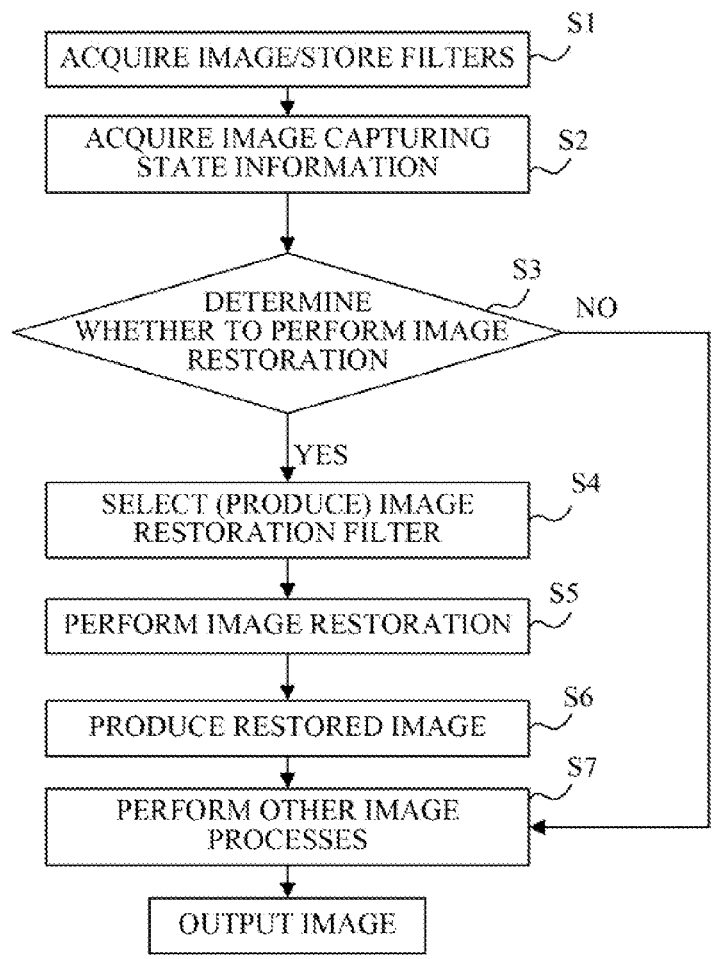
FIG. 2 is a flowchart showing an image process including an image restoration process to be performed by the image processing apparatus of Embodiment 1.

FIG. 2 is a flowchart showing a procedure of processing (image processing method) relating to the image restoration process and the geometric conversion process performed by the image restorer/distortion corrector 104b (referred to as "the image processor 104 in the following description). The image processor 104 is constituted by an image processing computer and executes the processing according to an image processing program as a computer program.

At step S1, the image processor 104 acquires (provides) the input image produced by using the output signal from the image sensor 102. Moreover, the image processor 104 stores image restoration filters to be used for the image restoration process in the memory 108 before or after the acquisition of the input image.

Next, at step S2, the image processor 104 acquires the image capturing state information from the state detector 107. In this description, the image capturing state includes three parameters: the zoom position, the aperture value and the in-focus object distance.

Next, at step S3 (determining step), the image processor 104 determines whether or not to perform the image restoration process on the input image depending on the image capturing state shown by the image capturing state information acquired at step S2. If determining to perform the image restoration process, the image processor 104 proceeds to step S4. On the other hand, if determining not to perform the image restoration process, the image processor 104 proceeds to step S7.

In this embodiment, the image restoration filters are provided not for all the image capturing states, but only for specific image capturing states (first state) for which a determination that the image restoration process is needed is made. In other words, the image restoration filters are not provided for image capturing states (second state) for which a determination that the image restoration process is not needed is made, and the image restoration process is not performed therefor.

The image restoration filter is produced on a basis of the point spread function (PSF) in each image capturing state of the image capturing optical system and therefore is a two-dimensional filter to restore asymmetric aberrations such as coma aberration. In other words, the image restoration process is different from one-dimensional processes such as the distortion correction process. Thus, providing the image restoration filters for all the image capturing states and storing them to the memory 108 makes amount of data of the image restoration filters enormous and requires a very large memory capacity of the memory 108. Moreover, performing the image restoration process for all the image capturing states increases processing time required before the restored image is output. Therefore, it is desirable to perform the image restoration process only for the image capturing states for which the image restoration process is needed and not to perform the image restoration process for the image capturing states for which the image restoration process is not needed without even providing the image restoration filter. The image capturing states for which the image restoration process is not needed will be described later.

In order to enable determination of whether or not to perform the image restoration process, the memory 108 further stores a list of the image capturing states (combinations of the zoom position, aperture value and in-focus object distance) for which the image restoration process is needed. The image processor 104 determines to perform the image restoration process if the image capturing state acquired at step S2 is included in the list and determines not to perform the image restoration process if the image capturing state acquired at step S2 is not included in the list. However, this determination method is an example, and other determination method may be used. For example, a method may be used which determines whether or not the image restoration filter corresponding to the image capturing state acquired at step S2 is stored (exists) in the memory 108.

At step S4, the image processor 104 selects and reads out (acquires) the image restoration filter corresponding to the image capturing state acquired at step S2 from the image restoration filters stored in the memory 108.

In the case where the filter coefficients are stored in the memory 108 as described above, the image processor 104 selects and reads out therefrom the filter coefficient corresponding to the image capturing state acquired at step S2 and produces the image restoration filter by using the selected filter coefficient. This process enables substantial acquisition of the image restoration filter. Steps S3 and S4 correspond to a filter acquiring step.

Next, at step S5, the image processor 104 performs the image restoration process on the input image acquired at step S1 by using the image restoration filter acquired at step S4. Then, at step S6, the image processor 104 produces the restored image as a resulting image of the image restoration process.

Next, at step S7, the image processor 104 performs one or more image processes other than the image restoration process on the restored image produced at step S6 or on the input image captured in the image capturing state for which the image processor 104 determines not to perform the image restoration process at step S3 to produce a final output image. The image processes other than the image restoration process include the distortion correction process and, for example, a color interpolation process (demosaicing process) performed when the restored image is a mosaic image. In addition, the image processes other than the image restoration process include an edge enhancement process, a shading compensation (peripheral light falloff correction) and others. These image processes other than the image restoration process may be performed not after the image restoration process, but before or in middle of the image restoration process.

Embodiment 2

Although Embodiment 1 described the image pickup apparatus using the image processing method (that is, the image pickup apparatus provided with the image processing apparatus), a second embodiment (Embodiment 2) of the present invention will describe a case where the image processing method is implemented by an image processing program installed into a personal computer.

Figure 3:
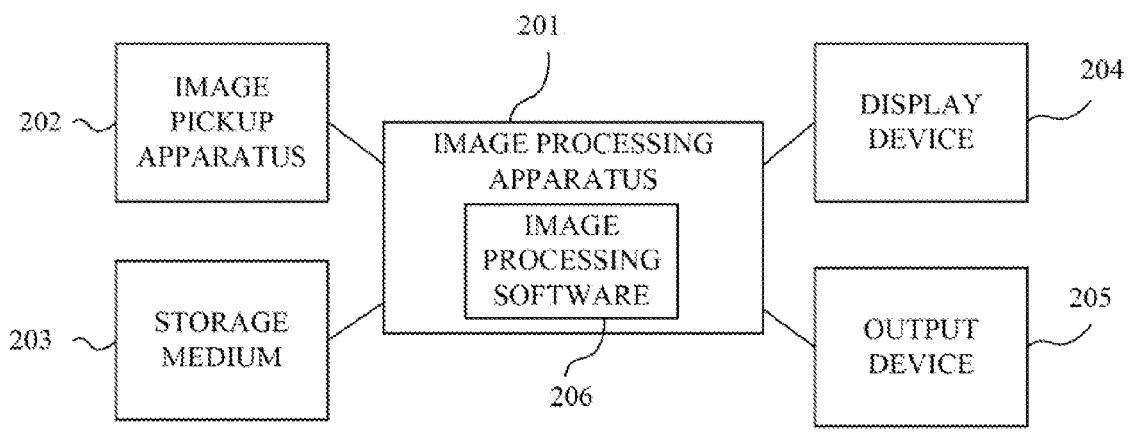
FIG. 3 shows an image processing apparatus that is Embodiment 2 of the present invention.

In FIG. 3, a personal computer 201 serves as the image processing apparatus into which image processing software 206 (image processing program) is installed.

An image pickup apparatus 202 is a general digital camera or a general video camera and may be an apparatus having an image capturing function, such as a microscope, an endoscope or a scanner. A storage medium 203 such as a semiconductor memory, a hard disk or a server on a network corresponds to a memory provided outside the image processing apparatus 201 and stores data of images produced by image capturing. Data of the image restoration filters may be stored to the storage medium 203.

The image processing apparatus 201 acquires an input image from the image pickup apparatus 202 or the storage medium 203 and performs the various image processes including the image restoration process, which were described in Embodiment 1, to produce an output image. The image processing apparatus 201 may acquire the image restoration filter to be used for the image restoration process from a memory provided thereinside or from the outside storage medium 203. Then, the image processing apparatus 201 outputs data of the output image to at least one of an output device 205, the image pickup apparatus 202 and the storage medium 203 or stores it to the memory provided inside the image processing apparatus 201.

The output device 205 includes a printer and others. The image processing apparatus 201 is connected with a display device 204 that is a monitor through which a user views images to perform image processing operations or estimate the output image.

Numerical Example

Next, description will be made of specific numerical examples of the image capturing states for which the image restoration process is not needed, which were mentioned in Embodiment 1. The image capturing state means, as described in Embodiment 1, the combination of the focal length (zoom position), the aperture value and the in-focus object distance of the image capturing optical system.

Figure 7:
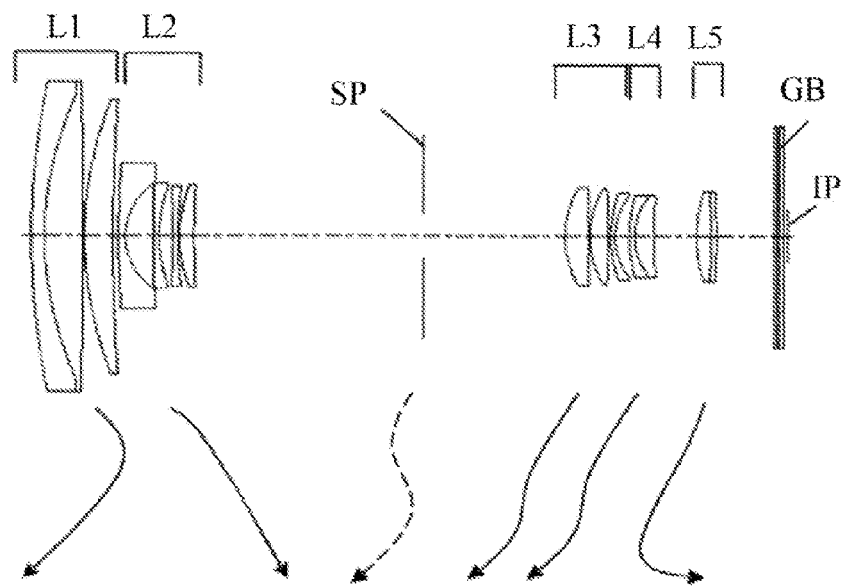
FIG. 7 is a sectional view of an image pickup optical system that is Numerical Example 1 corresponding to Embodiment 1 in an infinity in-focus state at a wide-angle end and in a fully-opened aperture state.
Figure 8A:
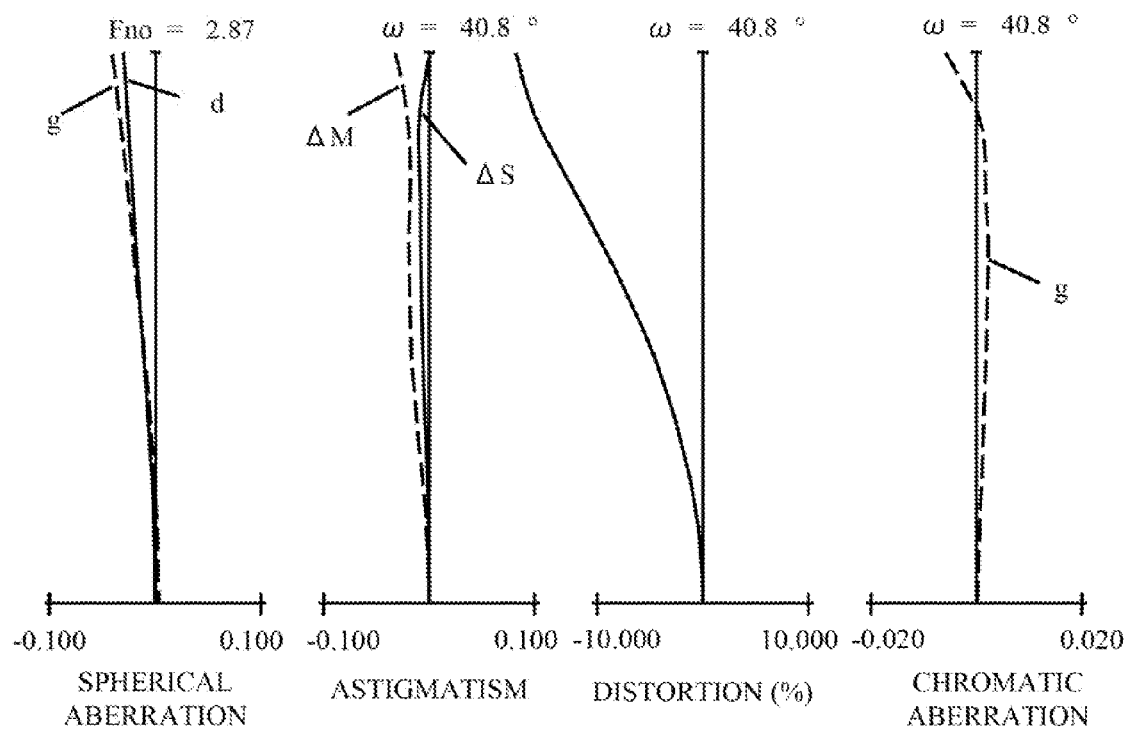
FIGS. 8A and 8B show longitudinal and lateral aberration charts of Numerical Example 1 in the infinity in-focus state at the wide-angle end and in the fully-opened aperture state.
Figure 8B:
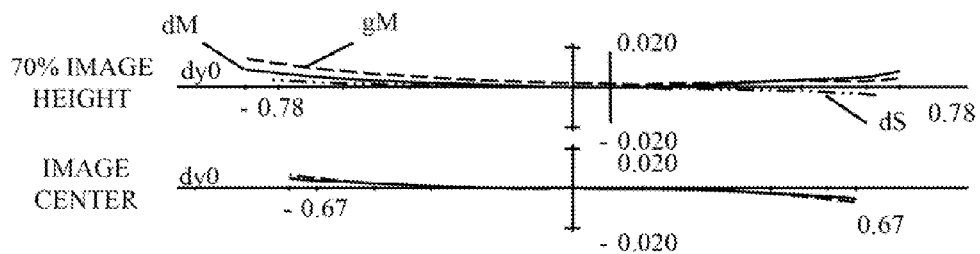

FIG. 7 shows an image capturing optical system of Numerical example 1, which is a high magnification zoom lens having a zoom ratio of 55.7 times. FIG. 7 shows a sectional view thereof in an infinity in-focus state at a wide-angle end and in a fully-opened aperture state. FIGS. 8A and 8B show aberration charts of longitudinal aberration (spherical aberration, astigmatism, distortion and chromatic aberration) and lateral aberration (such as coma aberration) of the image capturing optical system of Numerical Example 1 in the infinity in-focus state at the wide-angle end and in the fully-opened aperture state. The longitudinal aberration and lateral aberration in the aberration charts, Fno represents an F-number, and ω represents a half field angle. Moreover, d represents the longitudinal aberration for a d-line, g represents the longitudinal aberration for a g-line, ΔS represents the longitudinal aberration in a sagittal image surface, and AM represents the longitudinal aberration in a meridional image surface. Furthermore, dM represents the lateral aberration for a meridional ray of the d-line, dS represents the lateral aberration for a sagittal ray of the d-line, and gM represents the lateral aberration for a meridional ray of the g-line.

Figure 8C:
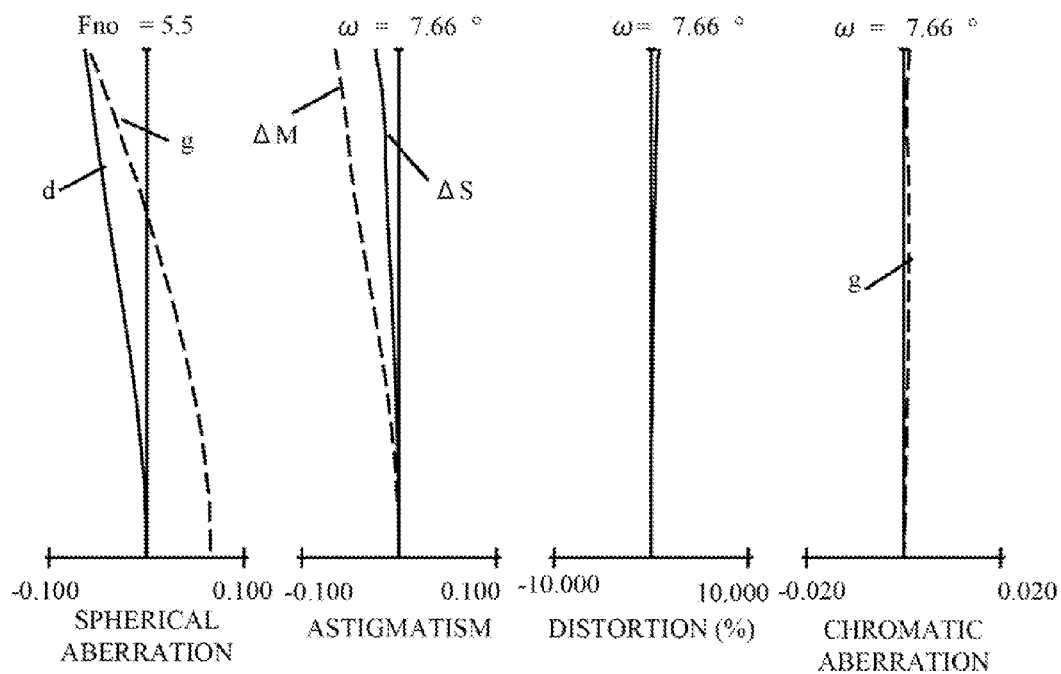
FIGS. 8C and 8D show longitudinal and lateral aberration charts of Numerical Example 1 in the infinity in-focus state at a middle zoom position and in the fully-opened aperture state.
Figure 8D:
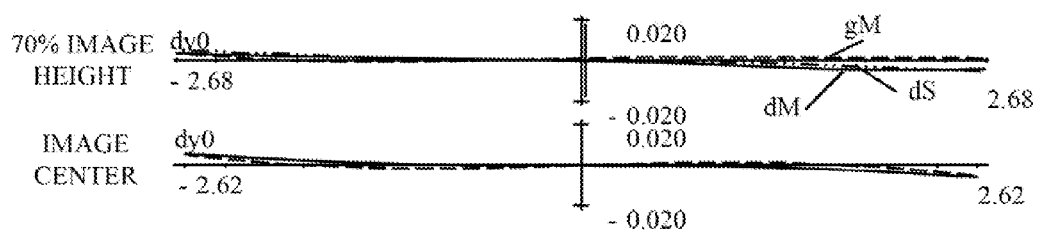
Figure 9A:
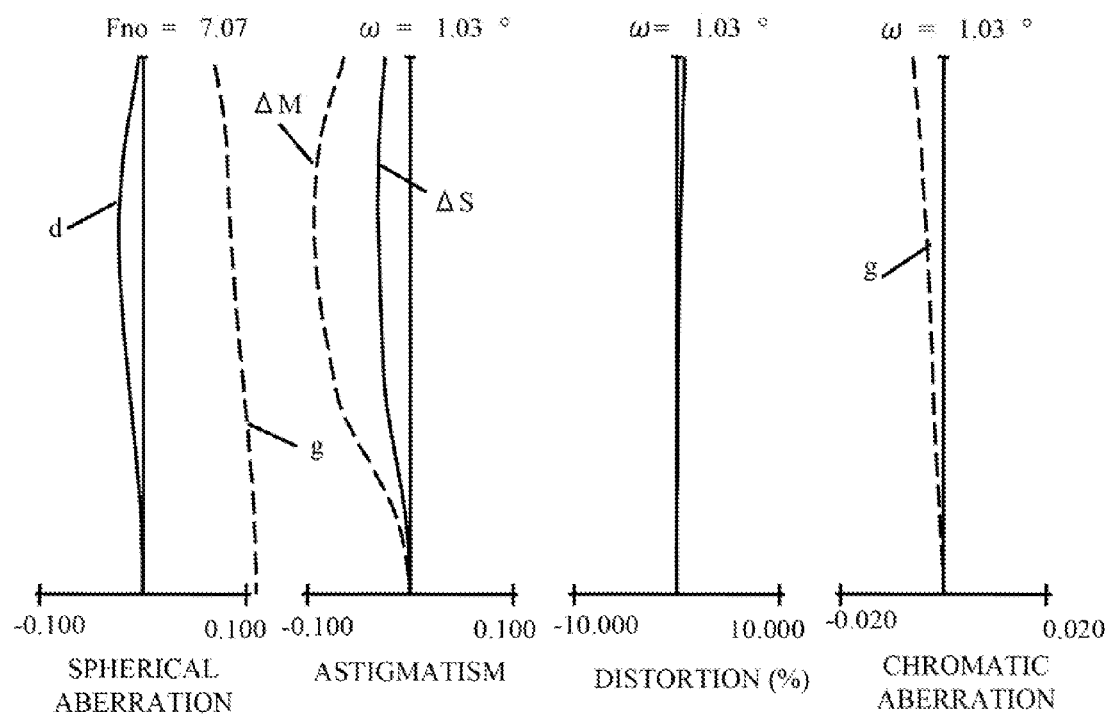
FIGS. 9A and 9B show longitudinal and lateral aberration charts of Numerical Example 1 in the infinity in-focus state at a telephoto end and in the fully-opened aperture state.
Figure 9B:
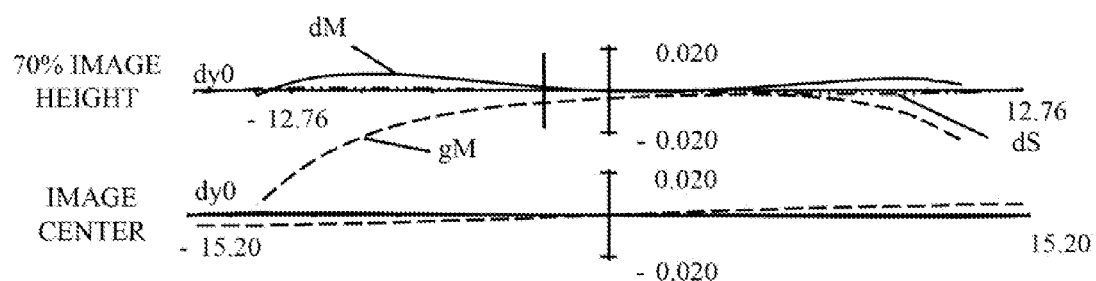
Figure 9C:
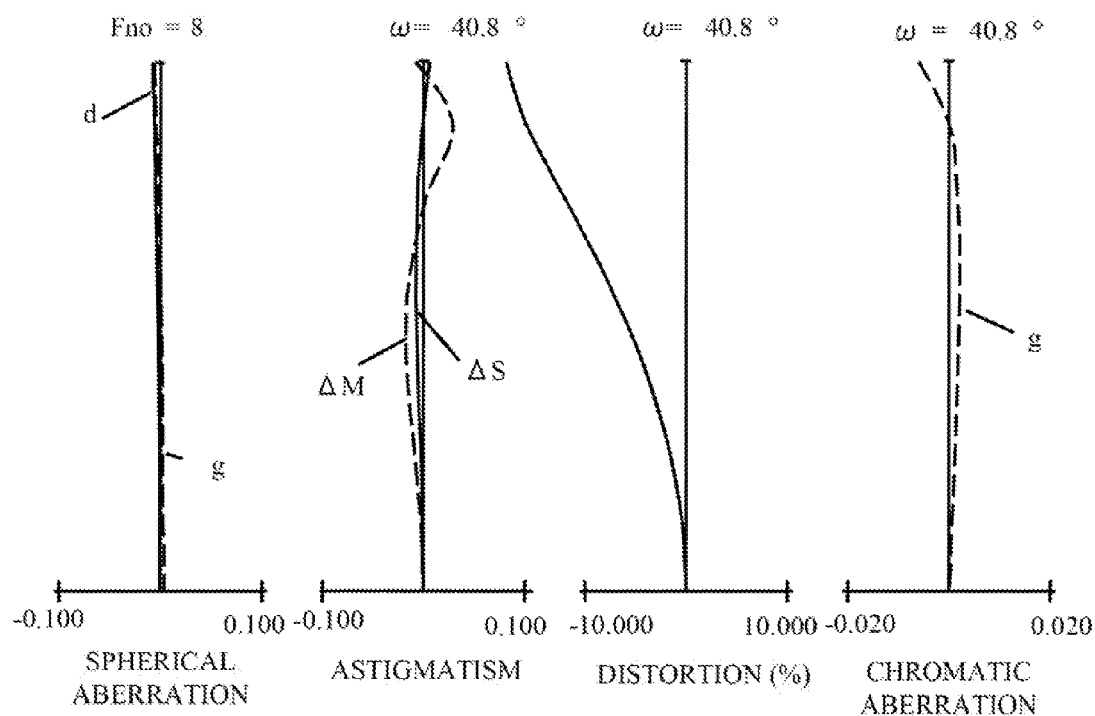
FIGS. 9C and 9D show longitudinal and lateral aberration charts of Numerical Example 1 in the infinity in-focus state at the wide-angle end and in an F8 aperture state.
Figure 9D:
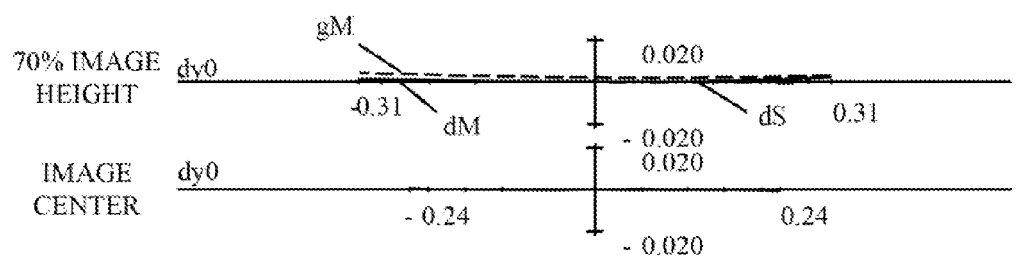
Figure 10A:
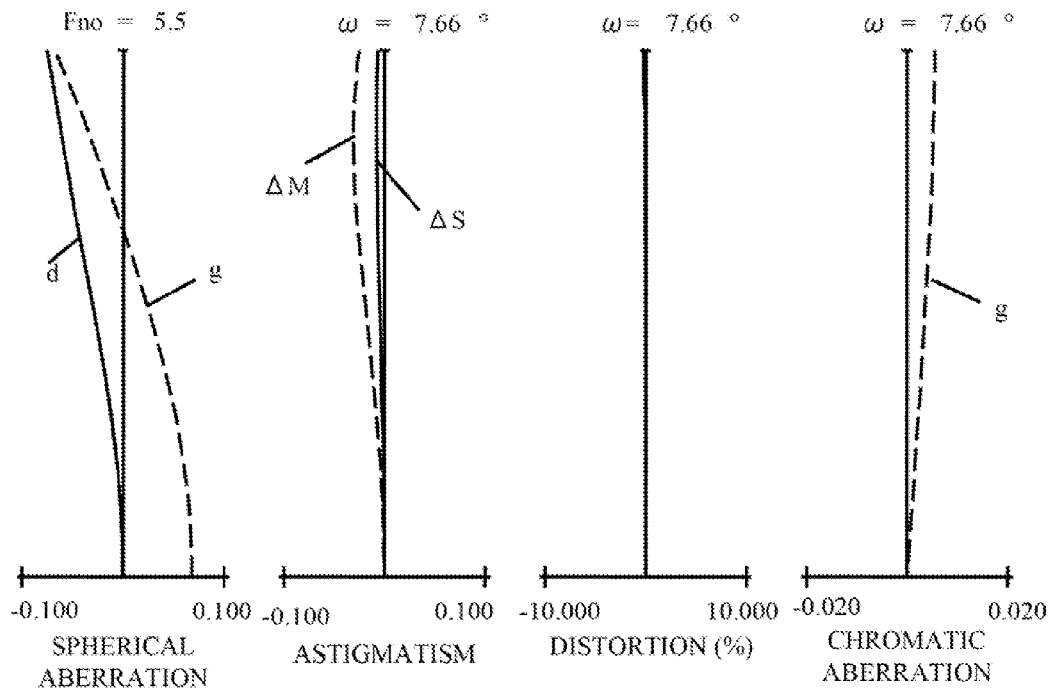
FIGS. 10A and 10B show longitudinal and lateral aberration charts of Numerical Example 1 in a 50 cm object distance in-focus state at the middle zoom position and in the fully-opened aperture state.
Figure 10B:
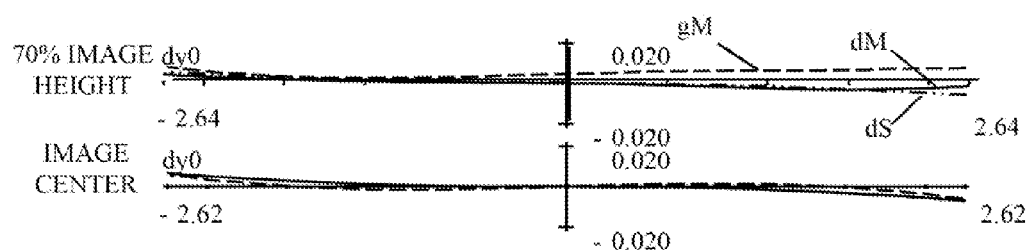

Moreover, FIGS. 8C and 8D show longitudinal and lateral aberration charts of the image capturing optical system of Numerical Example 1 in the infinity in-focus state at a middle zoom position and in the fully-opened aperture state. FIGS. 9A and 9B show longitudinal and lateral aberration charts of the image capturing optical system of Numerical Example 1 in the infinity in-focus state at a telephoto end and in the fully-opened aperture state. FIGS. 9C and 9D show longitudinal and lateral aberration charts of the image capturing optical system of Numerical Example 1 in the infinity in-focus state at the wide-angle end and in an F8 aperture state. FIGS. 10A and 10B show longitudinal and lateral aberration charts of the image capturing optical system of Numerical Example 1 in a 50 cm object distance in-focus state at the middle zoom position and in the fully-opened aperture state.

The image capturing optical system of Numerical example 1 includes, in order from an object side, a first lens unit L1 having a positive refractive power, a second lens unit L2 having a negative refractive power, a third lens unit L3 having a positive refractive power, a fourth lens unit L4 having a negative refractive power, a fifth lens unit L5 having a positive refractive power and a glass block GB showing an optical filter or the like. Reference character SP denotes an aperture stop, and reference character IP denotes an image surface.

In such a high magnification zoom lens, at the telephoto end where its focal length becomes long, longitudinal chromatic aberration and chromatic coma aberration for the g-line are generated, which degrades an image. Moreover, at the wide-angle end, aberrations in a peripheral image area such as coma aberration and field curvature are generated, which also degrades the image. On the other hand, in a middle zoom range (middle zoom positions) where the focal length is set between the telephoto end and the wide-angle end, though each aberration varies depending on the focal length, there is a zoom range where little aberrations are generated as shown in FIGS. 8C and 8D. In such a zoom range where little aberrations are generated, the image is also little degraded, so that it is possible to acquire a good image without performing the image restoration process.

Moreover, although the image capturing optical system at the wide-angle end in the fully-opened aperture state provides optical performance in which the aberrations in the peripheral image area are noticeable as shown in FIGS. 8A and 8B, narrowing the aperture stop to F8 improves the optical performance as shown in FIGS. 9C and 9D, which makes it possible to acquire a good image. On the other hand, although the image capturing optical system in the infinity in-focus state at the middle zoom position provides optical performance having no problem as shown in FIGS. 10A and 10B, focusing on an object at a close distance of 50 cm deteriorates the optical performance in the peripheral image area, which makes it impossible to acquire a good image.

As described above, the image capturing states include the first state where aberrations are large and thereby the image restoration process is needed and the second state where good optical performance including little aberrations can be provided and thereby the image restoration process is not needed as shown in FIGS. 8C, 8D, 9C and 9D. Thus, storing in the memory 108 no image restoration filters corresponding to the image capturing states (second state) where the good optical performance is provided enables significant reduction of the amount of data of the image restoration filters to be stored in the memory 108. Moreover, for such image capturing states, since the image restoration process is not performed, it is possible to significantly reduce the processing time.

Figure 11:
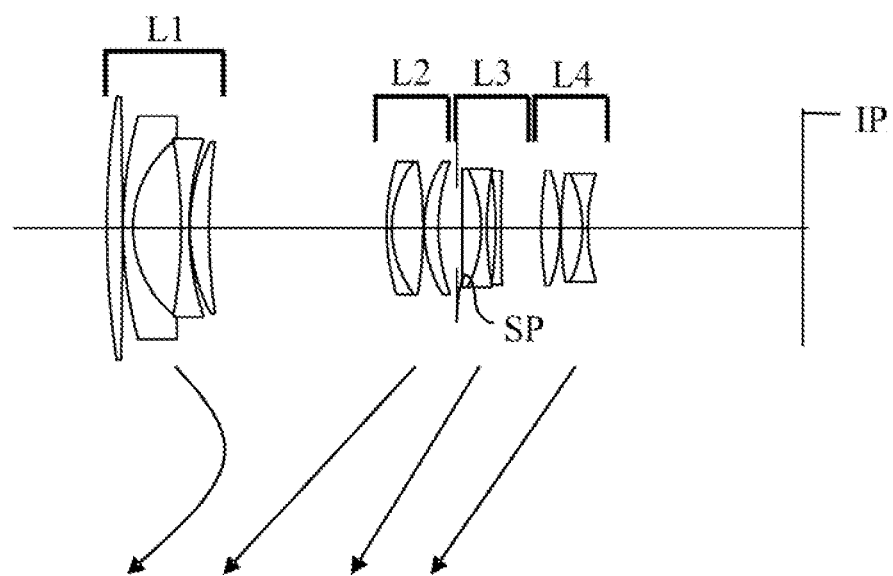
FIG. 11 is a sectional view of an image pickup optical system that is Numerical Example 2 corresponding to Embodiment 1 in an infinity in-focus state at a wide-angle end and in a fully-opened aperture state.
Figure 12A:
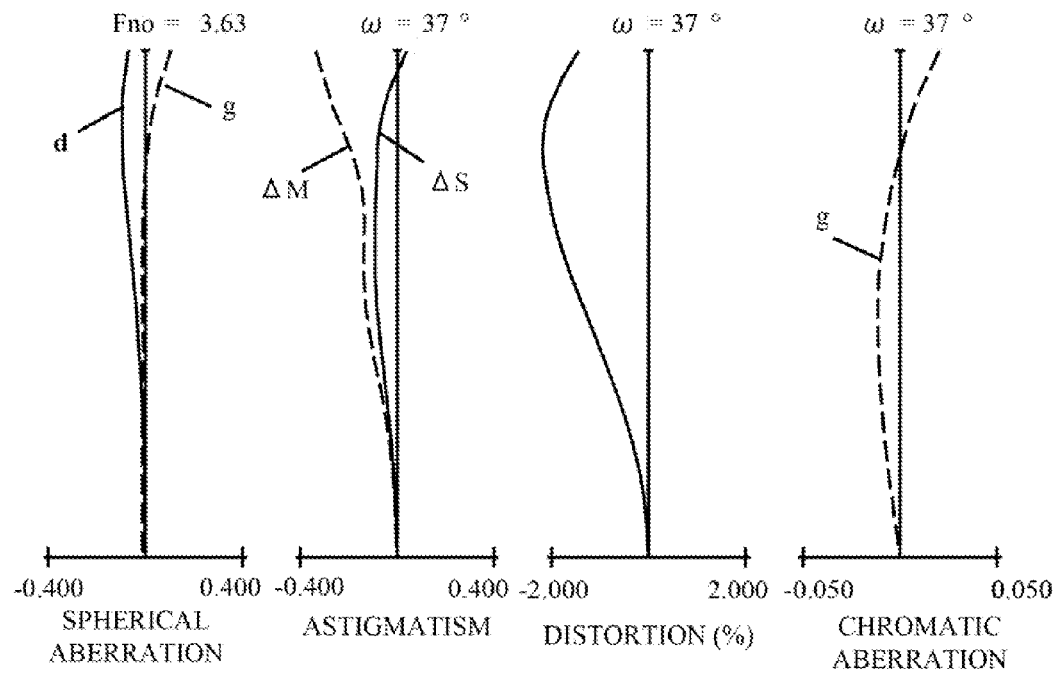
FIGS. 12A and 12B show longitudinal and lateral aberration charts of Numerical Example 2 in the infinity in-focus state at the wide-angle end and in the fully-opened aperture state.
Figure 12B:
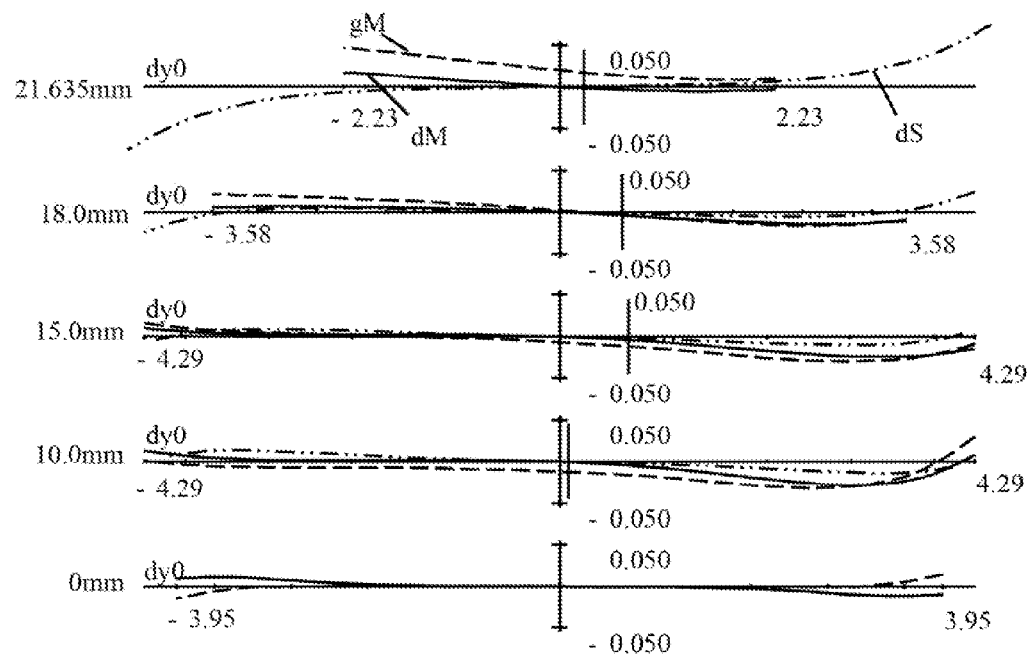
Figure 13A:
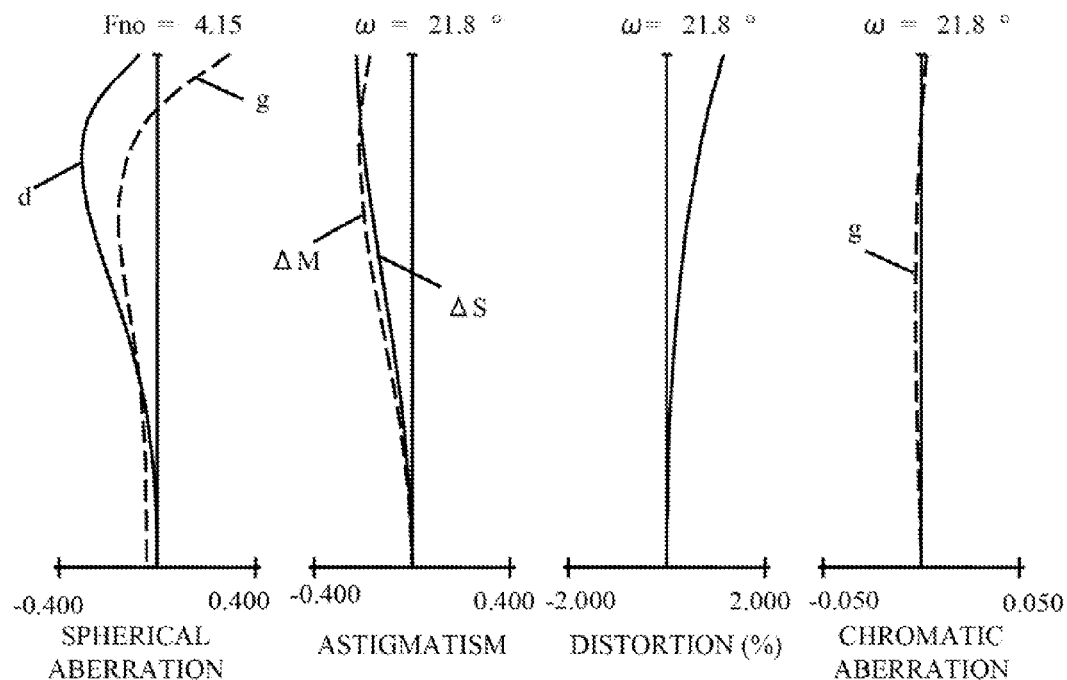
FIGS. 13A and 13B show longitudinal and lateral aberration charts of Numerical Example 2 in the infinity in-focus state at a middle zoom position and in the fully-opened aperture state.
Figure 13B:
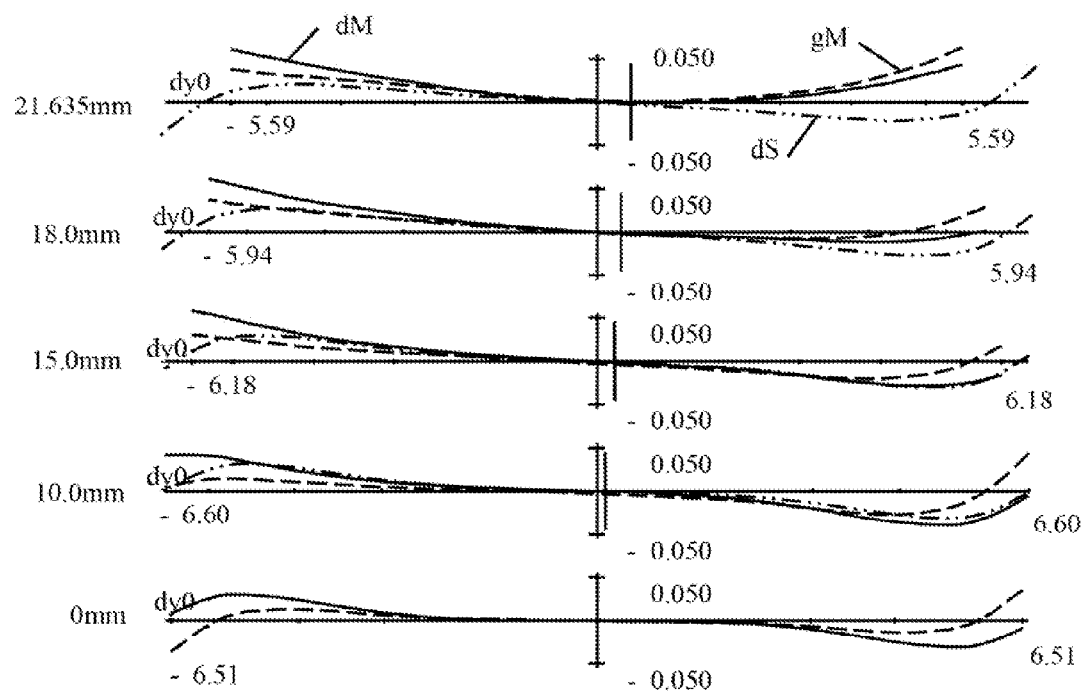

FIG. 11 shows an image capturing optical system of Numerical example 2, which is a zoom lens having a zoom ratio of 2.72 times. FIG. 11 shows a sectional view thereof in an infinity in-focus state at a wide-angle end and in a fully-opened aperture state. FIGS. 12A and 12B show aberration charts of longitudinal aberration (spherical aberration, astigmatism, distortion and chromatic aberration) and lateral aberration (such as coma aberration) of the image capturing optical system of Numerical Example 2 in the infinity in-focus state at the wide-angle end and in the fully-opened aperture state. Moreover, FIGS. 13A and 13B show longitudinal and lateral aberration charts of the image capturing optical system of Numerical Example 2 in the infinity in-focus state at a middle zoom position and in the fully-opened aperture state.

Figure 14A:
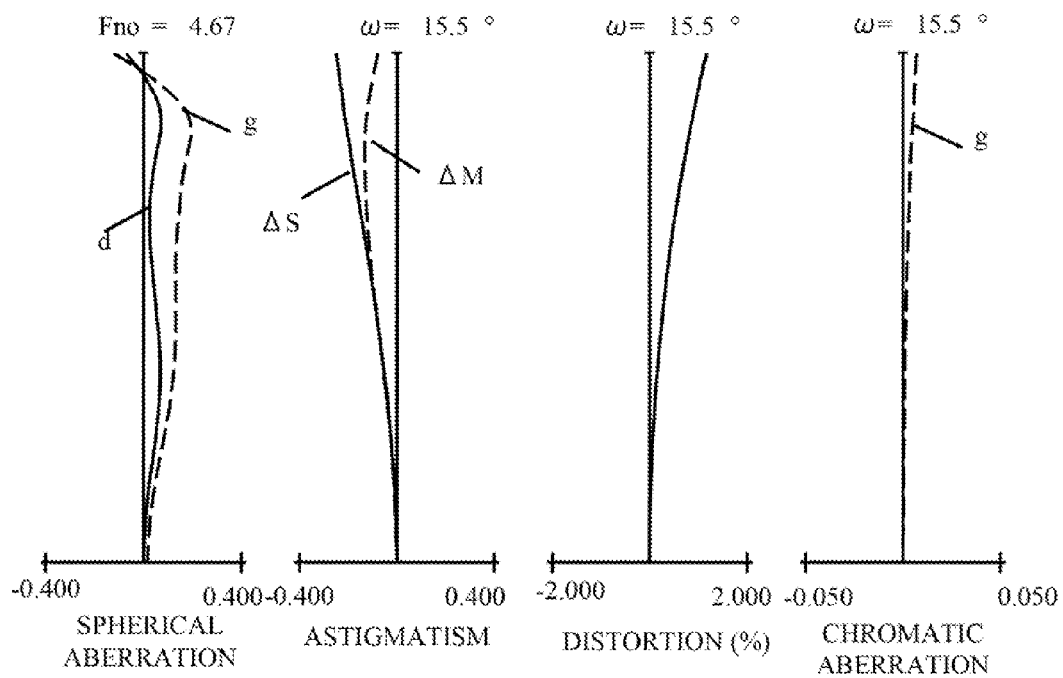
FIGS. 14A and 14B show longitudinal and lateral aberration charts of Numerical Example 2 in the infinity in-focus state at a telephoto end and in the fully-opened aperture state.
Figure 14B:
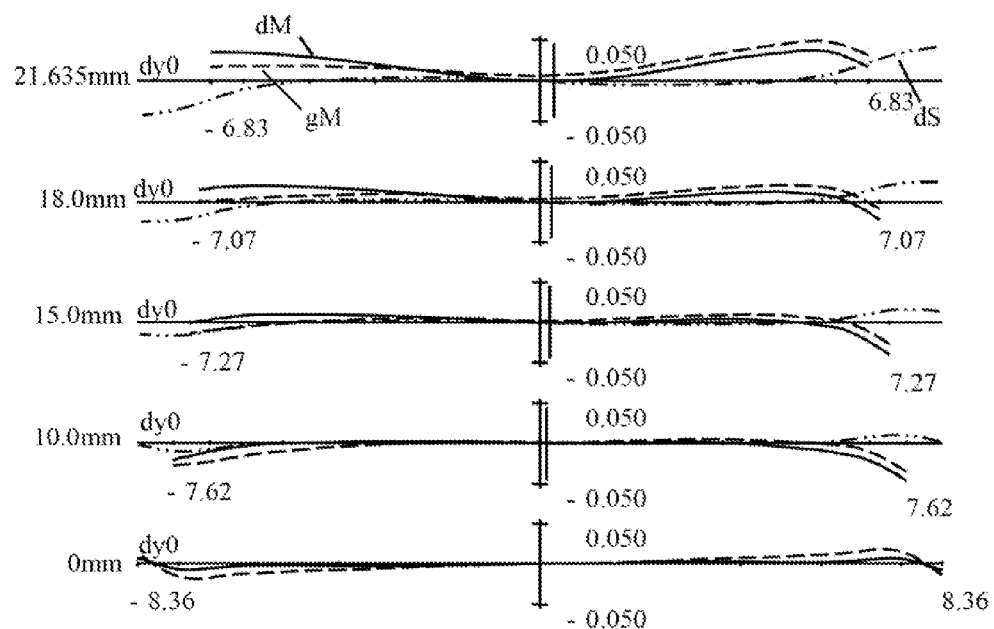

FIGS. 14A and 14B show longitudinal and lateral aberration charts of the image capturing optical system of Numerical Example 2 in the infinity in-focus state at a telephoto end and in the fully-opened aperture state.

The image capturing optical system of Numerical example 2 includes, in order from an object side, a first lens unit L1 having a negative refractive power, a second lens unit L2 having a positive refractive power, a third lens unit L3 having a negative refractive power and a fourth lens unit L4 having a positive refractive power. Reference character SP denotes an aperture stop, and reference character IP denotes an image surface.

In this zoom lens, as shown in FIG. 12B, at the wide-angle end, coma aberration becomes large at a middle image height (first image height) of about 10 mm, which degrades an image. However, in a range (second image height) from an image height of 18 mm to a peripheral image height, the coma aberration is reduced due to vignetting, which makes it possible to provide a good image. Moreover, as shown in FIG. 14B, at the telephoto end, the coma aberration is generated in a range (first image height) from an image height of 18 mm to the peripheral image height, the coma aberration is generated, which degrades the image. However, in a range (second image height) from a center of the image to a middle image height, optical performance of the image capturing optical system is good.

As described above, in the case where large aberration is generated only at a partial range (hereinafter referred to as "a first image height range") of the entire image height, the image restoration filters only for the first image height range where the aberration is larger than that at the second image height) is stored in the memory 108, and the image restoration process is performed only on an image area of the input image corresponding to the first image height range. This method makes it possible to reduce the amount of data of the image restoration filters to be stored in the memory 108.

In order to implement this method, the image processor 104 determines at step S3 in FIG. 2 whether or not to perform the image restoration process on the input image at each image height depending on the image capturing state. In other words, the image processor 104 determines whether or not to perform the image restoration process on the image area of the input image corresponding to the first image height range. Then, the image processor 104 acquires at step S4 the image restoration filter corresponding to the first image height range from the memory 108 and performs at step S5 the image restoration process on the image area of the input image corresponding to the first image height range.

Although this embodiment described the case where the optical performance is deteriorated in the middle image height range or the peripheral image height, in a case where spherical aberration or the like is large in a central image area, the image restoration process may be performed only on the central image area.

Next, specific numerical values of Numerical Examples 1 and 2 are shown. Ri (i=1, 2, 3, . . . ) represents curvature radius of an i-th lens surface counted from the object side, and di represents thickness or aerial distance between the i-th lens surface and an (i+1)-th lens surface. Moreover, ndi and vdi respectively represent refractive index and Abbe number of a material of an i-th lens for the d-line. When the lens surface has an aspheric shape, which is shown by "*", the aspheric shape is expressed by the following expression where R represents curvature radius at a central portion of the lens surface, X represents position (coordinate) in the optical axis direction, Y represents position (coordinate) in a direction orthogonal to the optical axis direction, and Ai (i=1, 2, 3, . . . ) represents an aspheric coefficient:

$$X=(Y^2/R)/\{1+[1-(K+1)(Y/R)^2]^{1/2}\}+A4Y^4+A6Y^6+A8Y^8+A10Y^{10}$$

In addition, "e±M" represents "×10$^{\pm M}$".

Numerical Example 1

| Unit mm | | | | |
|---|---|---|---|---|
| Surface Data | | | | |
| Surface No. | r | d | nd | vd | Effective Diameter |
| 1 | 108.140 | 1.80 | 1.72047 | 34.7 | 41.86 |
| 2 | 46.881 | 5.38 | 1.49700 | 81.5 | 38.16 |
| 3 | −948.373 | 0.18 | | | 38.02 |
| 4 | 51.471 | 3.98 | 1.59282 | 68.6 | 37.27 |
| 5 | 280.555 | (Variable) | | | 36.83 |
| 6 | 142.872 | 0.95 | 1.88300 | 40.8 | 19.50 |
| 7 | 9.035 | 3.72 | | | 14.11 |
| 8 | 420.609 | 0.80 | 1.80400 | 46.6 | 13.91 |
| 9 | 19.873 | 1.94 | | | 13.33 |
| 10 | −96.265 | 0.70 | 1.80400 | 46.6 | 13.34 |
| 11 | 62.840 | 0.20 | | | 13.42 |
| 12 | 19.601 | 2.28 | 1.94595 | 18.0 | 13.75 |
| 13 | 111.630 | (Variable) | | | 13.49 |
| 14 (Stop) | ∞ | (Variable) | | | 8.73 |
| 15* | 12.945 | 3.31 | 1.55332 | 71.7 | 12.72 |
| 16* | ∞ | 0.20 | | | 12.61 |
| 17 | 13.677 | 2.52 | 1.43875 | 94.9 | 12.51 |
| 18 | −123.271 | 0.33 | | | 12.22 |
| 19 | 17.756 | 0.60 | 1.83400 | 37.2 | 11.43 |
| 20 | 9.366 | (Variable) | | | 10.63 |
| 21 | 21.059 | 0.70 | 1.90366 | 31.3 | 10.61 |
| 22 | 9.026 | 2.67 | 1.58144 | 40.8 | 10.19 |
| 23 | 60.430 | (Variable) | | | 10.13 |
| 24 | 21.336 | 2.10 | 1.49700 | 81.5 | 11.75 |
| 25 | −55.035 | 0.60 | 2.00069 | 25.5 | 11.67 |
| 26 | −105.716 | (Variable) | | | 11.67 |
| 27 | ∞ | 0.30 | 1.51633 | 64.1 | 30.00 |
| 28 | ∞ | 0.47 | | | 30.00 |
| 29 | ∞ | 0.50 | 1.51633 | 64.1 | 30.00 |
| 30 | ∞ | (Variable) | | | 30.00 |
| Image Plane | ∞ | | | | |

| Aspheric Data | | |
|---|---|---|
| 15-th surface | | |
| K = −2.44016e+000 | A4 = 7.92900e−005 | A6 = −3.22651e−007 |
| A8 = 6.18532e−009 | A10 = −4.46626e−011 | |
| 16-th surface | | |
| K = −1.89560e+010 | A4 = 2.15402e−005 | A6 = 2.47226e−007 |

| Lens Data | | | |
|---|---|---|---|
| Zoom Ratio 55.70 | | | |
| | WIDE | MIDDLE | TELE |
| Focal Length | 3.86 | 28.81 | 215.00 |
| F-number | 2.87 | 5.50 | 7.07 |
| Field Angle | 40.81 | 7.66 | 1.03 |
| Image Height | 3.33 | 3.88 | 3.88 |
| Entire Lens Length | 105.12 | 125.61 | 151.12 |
| Back Focus | 0.53 | 0.53 | 0.53 |

| | WIDE | MIDDLE | TELE | 50 cm Object Distance |
|---|---|---|---|---|
| d5 | 0.78 | 39.83 | 66.10 | 39.83 |
| d13 | 31.87 | 8.14 | 1.50 | 8.14 |
| d14 | 19.64 | 5.07 | 1.50 | 5.07 |

-continued

Unit mm

| | | | | |
|---|---|---|---|---|
| d20 | 2.15 | 3.26 | 4.34 | 3.26 |
| d23 | 5.87 | 11.10 | 32.90 | 9.52 |
| d26 | 8.05 | 21.45 | 8.03 | 23.03 |
| d30 | 0.53 | 0.53 | 0.53 | 0.53 |
| Entrance Pupil | 18.62 | 128.02 | 697.02 | |
| Exit Pupil | 75.84 | −83.36 | 1206.59 | |
| FPP | 22.68 | 146.93 | 950.35 | |
| RPP | −3.33 | −28.28 | −214.47 | |

Lens Group data

| Group | Start Surface | Focal length | Group Length | FPP | RPP |
|---|---|---|---|---|---|
| 1 | 1 | 84.83 | 11.34 | 3.22 | −4.14 |
| 2 | 6 | −8.98 | 10.59 | 0.79 | −7.77 |
| Stop | 14 | ∞ | 0.00 | 0.00 | −0.00 |
| 3 | 15 | 21.73 | 6.96 | −2.41 | −6.21 |
| 4 | 21 | −637.69 | 3.37 | 21.10 | 18.42 |
| 5 | 24 | 42.45 | 2.70 | 0.14 | −1.57 |
| GB | 27 | ∞ | 1.27 | 0.50 | −0.50 |

Single Lens Data

| Lens | Start Surface | Focal Length |
|---|---|---|
| 1 | 1 | −116.30 |
| 2 | 2 | 90.05 |
| 3 | 4 | 105.65 |
| 4 | 6 | −10.96 |
| 5 | 8 | −25.97 |
| 6 | 10 | −47.20 |
| 7 | 12 | 24.83 |
| 8 | 15 | 23.39 |
| 9 | 17 | 28.22 |
| 10 | 19 | −24.57 |
| 11 | 21 | −17.98 |
| 12 | 22 | 17.91 |
| 13 | 24 | 31.22 |
| 14 | 25 | −115.40 |
| 15 | 27 | 0.00 |
| 16 | 29 | 0.00 |

(FPP = Front Principal Point, RPP = Rear Principal Point)

Numerical Example 2

Unit mm

Surface Data

| Surface No. | r | d | nd | vd | Effective Diameter |
|---|---|---|---|---|---|
| 1 | 168.906 | 2.79 | 1.60311 | 60.6 | 46.54 |
| 2 | −1396.116 | 0.15 | | | 45.54 |
| 3 | 77.784 | 1.80 | 1.80610 | 40.9 | 39.38 |
| 4 | 20.706 | 8.71 | | | 31.35 |
| 5 | −92.805 | 1.50 | 1.60311 | 60.6 | 31.22 |
| 6 | 50.759 | 0.15 | | | 30.07 |
| 7 | 34.395 | 3.45 | 1.84666 | 23.9 | 30.08 |
| 8 | 112.303 | (Variable) | | | 29.67 |
| 9 | 41.185 | 1.00 | 1.84666 | 23.9 | 22.94 |
| 10 | 20.343 | 5.70 | 1.65160 | 58.5 | 22.82 |
| 11 | −72.237 | 0.15 | | | 22.97 |
| 12 | 23.162 | 2.59 | 1.74400 | 44.8 | 22.88 |
| 13 | 34.884 | (Variable) | | | 22.22 |
| 14 (Stop) | ∞ | 1.03 | | | 20.72 |
| 15 | −1546.248 | 3.41 | 1.69895 | 30.1 | 20.38 |
| 16 | −24.251 | 1.00 | 1.69350 | 53.2 | 20.14 |
| 17 | 56.777 | 1.61 | | | 19.35 |
| 18 | −68.912 | 1.00 | 1.65412 | 39.7 | 19.34 |
| 19 | 254.899 | (Variable) | | | 19.45 |
| 20* | 58.792 | 3.46 | 1.69350 | 53.2 | 19.66 |
| 21 | −31.155 | 0.15 | | | 19.66 |
| 22 | 61.160 | 3.88 | 1.65844 | 50.9 | 18.44 |
| 23 | −22.397 | 1.00 | 1.74950 | 35.3 | 17.88 |
| 24 | 32.672 | (Variable) | | | 17.67 |
| Image Plane | ∞ | | | | |

Aspheric Data
20-th surface

K = −3.59189e+001  A4 = 5.45246e−006  A6 = −8.40549e−008
A8 = 1.18578e−010  A10 = 9.55646e−013  A12 = −4.30763e−015

Lens Data
Zoom Ratio 2.72

| | WIDE | MIDDLE | TELE |
|---|---|---|---|
| Focal Length | 28.70 | 54.00 | 78.00 |
| F-number | 3.63 | 4.15 | 4.67 |
| Field Angle | 37.01 | 21.83 | 15.50 |
| Image Height | 21.64 | 21.64 | 21.64 |
| Entire Lens Length | 126.44 | 120.69 | 131.53 |
| Back Focus | 39.10 | 57.87 | 77.65 |
| d8 | 32.21 | 9.36 | 2.12 |
| d13 | 3.35 | 6.03 | 6.24 |
| d19 | 7.26 | 2.90 | 1.00 |
| d24 | 39.10 | 57.87 | 77.65 |
| Entrance Pupil | 27.13 | 23.17 | 21.10 |
| Exit Pupil | −19.59 | −13.41 | −11.10 |
| FPP | 41.80 | 36.26 | 30.56 |
| RPP | 10.40 | 3.87 | −0.35 |

Lens Group data

| Group | Start Surface | Focal length | Group Length | FPP | RPP |
|---|---|---|---|---|---|
| 1 | 1 | −39.50 | 18.55 | 4.44 | −9.97 |
| 2 | 9 | 31.78 | 9.44 | 1.57 | −4.03 |
| 3 | 14 | −40.32 | 8.05 | 4.43 | −1.39 |
| 4 | 20 | 47.48 | 8.49 | −2.91 | −7.37 |

Single Lens Data

| Lens | Start Surface | Focal Length |
|---|---|---|
| 1 | 1 | 250.00 |
| 2 | 3 | −35.51 |
| 3 | 5 | −54.19 |
| 4 | 7 | 57.39 |
| 5 | 9 | −48.55 |
| 6 | 10 | 24.97 |
| 7 | 12 | 84.66 |
| 8 | 15 | 35.22 |
| 9 | 16 | −24.38 |
| 10 | 18 | −82.83 |
| 11 | 20 | 29.83 |
| 12 | 22 | 25.37 |
| 13 | 23 | −17.59 |

According to Embodiments 1 and 2, since it is only necessary to provide the image restoration filters only for the image capturing states for which the determination that the image restoration process is performed is made, the amount of data of the image restoration filters to be stored in the memory can be reduced. Moreover, since the image restoration process is performed on the input image captured in the image capturing state for which the image restoration process is needed, a good restored image can be acquired.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2012-140646, filed on Jun. 22, 2012, which is hereby incorporated by reference herein in its entirety.

What is claimed is:

1. An image processing method comprising:
acquiring an input image produced by image capturing through an image capturing optical system;
storing image restoration filters to be used for an image restoration process to a memory;
acquiring information showing an image capturing state that is a state of the image capturing optical system for the image capturing;
determining whether or not to perform the image restoration process on the input image depending on the image capturing state;
acquiring the image restoration filter corresponding to the image capturing state from the memory when a determination to perform the image restoration process is made; and
performing the image restoration process on the input image by using the acquired image restoration filter, and not performing the image restoration process on the input image, even in a case where the input image includes an image degradation due to an aberration of the image capturing optical system, when a determination to not perform the image restoration process is made, wherein
the image restoration process is a process for correcting the input image by using information on an optical transfer function of the image capturing optical system, and
the image restoration filters stored to the memory are provided only for a specific image capturing state for which a determination to perform the image restoration process is made.

2. The image processing method according to claim 1, wherein, in a case where aberration of the image capturing optical system when the image capturing state is a first state is larger than that when the image capturing state is a second state, the method determines to perform the image restoration process when the image capturing state is the first state and determines not to perform the image restoration process when the image capturing state is the second state.

3. The image processing method according to claim 1, wherein the image capturing state includes at least one of a focal length, an aperture value and an in-focus object distance.

4. The image processing method according to claim 1, wherein, in a case where aberration of the image capturing optical system at a first image height is larger than that at a second image height, the method determines, in the determination of whether or not to perform the image restoration process, to perform the image restoration process on an image area of the input image corresponding to the first image height and acquires the image restoration filter corresponding to the first image height from the memory.

5. An image processing apparatus comprising:
an image acquirer configured to acquire an input image produced by image capturing through an image capturing optical system;
a memory to store image restoration filters to be used for an image restoration process;
an image capturing state acquirer configured to acquire information showing an image capturing state that is a state of the image capturing optical system for the image capturing;
a determiner configured to determine whether or not to perform the image restoration process on the input image depending on the image capturing state; and
a processor configured to acquire the image restoration filter corresponding to the image capturing state from the memory when a determination to perform the image restoration process is made, to perform the image restoration process on the input image by using the acquired image restoration filter, and to not perform the image restoration process on the input image, even in a case where the input image includes an image degradation due to an aberration of the image capturing optical system, when a determination to not perform the image restoration process is made, wherein
the image restoration process is a process for correcting the input image by using information on an optical transfer function of the image capturing optical system, and
the image restoration filters stored to the memory are provided only for a specific image capturing state for which a determination to perform the image restoration process is made.

6. An image pickup apparatus comprising:
an image capturer configured to perform image capturing through an image capturing optical system to produce a captured image; and
an image processing apparatus comprising:
an image acquirer configured to acquire the captured image as an input image;
a memory to store an image restoration filter to be used for an image restoration process;
an image capturing state acquirer configured to acquire information showing an image capturing state that is a state of the image capturing optical system for the image capturing;
a determiner configured to determine whether or not to perform the image restoration process on the input image depending on the image capturing state; and
a processor configured to acquire the image restoration filter corresponding to the image capturing state from the memory when a determination to perform the image restoration process is made by the determiner, to perform the image restoration process on the input image by using the acquired image restoration filter, and to not perform the image restoration process on the input image, even in a case where the input image includes an image degradation due to an aberration of the image capturing optical system, when a determination to not perform the image restoration process is made by the determiner, wherein
the image restoration process is a process for correcting the input image by using information on an optical transfer function of the image capturing optical system, and
the image restoration filters stored to the memory are provided only for a specific image capturing state for which a determination to perform the image restoration process is made.

7. A non-transitory computer-readable storage medium storing an image processing program to cause a computer to execute an image process, the image process comprising the steps of:
acquiring an input image produced by image capturing through an image capturing optical system;

storing an image restoration filter to be used for an image restoration process to a memory provided inside or outside the computer;

acquiring information showing an image capturing state that is a state of the image capturing optical system for the image capturing;

determining whether or not to perform the image restoration process on the input image depending on the image capturing state;

acquiring the image restoration filter corresponding to the image capturing state from the memory when a determination to perform the image restoration process is made; and performing the image restoration process on the input image by using the acquired image restoration filter, and not performing the image restoration process on the input image, even in a case where the input image includes an image degradation due to an aberration of the image capturing optical system, when a determination to not perform the image restoration process is made, wherein the image restoration process is a process for correcting the input image by using information on an optical transfer function of the image capturing optical system, and the image restoration filters stored to the memory are provided only for a specific image capturing state for which a determination to perform the image restoration process is made.

8. An image processing method comprising:

acquiring an input image produced by image capturing through an image capturing optical system;

storing image restoration filters to be used for an image restoration process to a memory;

acquiring information showing an image capturing state that is a state of the image capturing optical system for the image capturing;

determining whether or not to perform the image restoration process on the input image depending on the image capturing state;

acquiring the image restoration filter corresponding to the image capturing state from the memory only when a determination to perform the image restoration process is made; and performing the image restoration process on the input image by using the acquired image restoration filter, and wherein, in a case where aberration of the image capturing optical system when the image capturing state is a first state is larger than that when the image capturing state is a second state, the method determines to perform the image restoration process when the image capturing state is the first state and determines not to perform the image restoration process when the image capturing state is the second state.

9. An image processing method comprising:

acquiring an input image produced by image capturing through an image capturing optical system;

storing image restoration filters to be used for an image restoration process to a memory;

acquiring information showing an image capturing state that is a state of the image capturing optical system for the image capturing;

determining whether or not to perform the image restoration process on the input image depending on the image capturing state;

acquiring the image restoration filter corresponding to the image capturing state from the memory only when a determination to perform the image restoration process is made; and performing the image restoration process on the input image by using the acquired image restoration filter, and wherein, in a case where aberration of the image capturing optical system at a first image height is larger than that at a second image height, the method determines, in the determination of whether or not to perform the image restoration process, to perform the image restoration process on an image area of the input image corresponding to the first image height and acquires the image restoration filter corresponding to the first image height from the memory.

10. An image processing apparatus comprising:

an image acquirer configured to acquire an input image produced by image capturing through an image capturing optical system;

a memory to store image restoration filters to be used for an image restoration process;

an image capturing state acquirer configured to acquire information showing an image capturing state that is a state of the image capturing optical system for the image capturing;

a determiner configured to determine whether or not to perform the image restoration process on the input image depending on the image capturing state; and a processor configured to acquire the image restoration filter corresponding to the image capturing state from the memory only when a determination to perform the image restoration process is made and performs the image restoration process on the input image by using the acquired image restoration filter, and wherein, in a case where aberration of the image capturing optical system when the image capturing state is a first state is larger than that when the image capturing state is a second state, the determiner determines to perform the image restoration process when the image capturing state is the first state and determines not to perform the image restoration process when the image capturing state is the second state.

11. An image processing apparatus comprising:

an image acquirer configured to acquire an input image produced by image capturing through an image capturing optical system;

a memory to store image restoration filters to be used for an image restoration process;

an image capturing state acquirer configured to acquire information showing an image capturing state that is a state of the image capturing optical system for the image capturing;

a determiner configured to determine whether or not to perform the image restoration process on the input image depending on the image capturing state; and a processor configured to acquire the image restoration filter corresponding to the image capturing state from the memory only when a determination to perform the image restoration process is made and performs the image restoration process on the input image by using the acquired image restoration filter, and wherein, in a case where aberration of the image capturing optical system at a first image height is larger than that at a second image height, the determiner determines, in the determination of whether or not to perform the image restoration process, to perform the image restoration process on an image area of the input image corresponding to the first image height and acquires the image restoration filter corresponding to the first image height from the memory.

12. An image pickup apparatus comprising:
an image capturer configured to perform image capturing through an image capturing optical system to produce a captured image; and
an image processing apparatus comprising:
an image acquirer configured to acquire the captured image as an input image;
a memory to store an image restoration filter to be used for an image restoration process;
an image capturing state acquirer configured to acquire information showing an image capturing state that is a state of the image capturing optical system for the image capturing;
a determiner configured to determine whether or not to perform the image restoration process on the input image depending on the image capturing state; and
a processor configured to acquire the image restoration filter corresponding to the image capturing state from the memory only when a determination to perform the image restoration process is made by the determiner and performs the image restoration process on the input image by using the acquired image restoration filter, and
wherein, in a case where aberration of the image capturing optical system when the image capturing state is a first state is larger than that when the image capturing state is a second state, the determiner determines to perform the image restoration process when the image capturing state is the first state and determines not to perform the image restoration process when the image capturing state is the second state.

13. An image pickup apparatus comprising:
an image capturer configured to perform image capturing through an image capturing optical system to produce a captured image; and
an image processing apparatus comprising:
an image acquirer configured to acquire the captured image as an input image;
a memory to store an image restoration filter to be used for an image restoration process;
an image capturing state acquirer configured to acquire information showing an image capturing state that is a state of the image capturing optical system for the image capturing;
a determiner configured to determine whether or not to perform the image restoration process on the input image depending on the image capturing state; and
a processor configured to acquire the image restoration filter corresponding to the image capturing state from the memory only when a determination to perform the image restoration process is made by the determiner and performs the image restoration process on the input image by using the acquired image restoration filter, and
wherein, in a case where aberration of the image capturing optical system at a first image height is larger than that at a second image height, the determiner determines, in the determination of whether or not to perform the image restoration process, to perform the image restoration process on an image area of the input image corresponding to the first image height and acquires the image restoration filter corresponding to the first image height from the memory.

14. A non-transitory computer-readable storage medium storing an image processing program to cause a computer to execute an image process, the image process comprising the steps of:
acquiring an input image produced by image capturing through an image capturing optical system;
storing an image restoration filter to be used for an image restoration process to a memory provided inside or outside the computer;
acquiring information showing an image capturing state that is a state of the image capturing optical system for the image capturing;
determining whether or not to perform the image restoration process on the input image depending on the image capturing state;
acquiring the image restoration filter corresponding to the image capturing state from the memory only when a determination to perform the image restoration process is made; and
performing the image restoration process on the input image by using the acquired image restoration filter, and
wherein, in a case where aberration of the image capturing optical system when the image capturing state is a first state is larger than that when the image capturing state is a second state, the image process determines to perform the image restoration process when the image capturing state is the first state and determines not to perform the image restoration process when the image capturing state is the second state.

15. A non-transitory computer-readable storage medium storing an image processing program to cause a computer to execute an image process, the image process comprising the steps of:
acquiring an input image produced by image capturing through an image capturing optical system;
storing an image restoration filter to be used for an image restoration process to a memory provided inside or outside the computer;
acquiring information showing an image capturing state that is a state of the image capturing optical system for the image capturing;
determining whether or not to perform the image restoration process on the input image depending on the image capturing state;
acquiring the image restoration filter corresponding to the image capturing state from the memory only when a determination to perform the image restoration process is made; and
performing the image restoration process on the input image by using the acquired image restoration filter, and
wherein, in a case where aberration of the image capturing optical system at a first image height is larger than that at a second image height, the image process determines, in the determination of whether or not to perform the image restoration process, to perform the image restoration process on an image area of the input image corresponding to the first image height and acquires the image restoration filter corresponding to the first image height from the memory.

16. The image pickup apparatus according to claim 6, wherein the image capturing state includes at least one of a focal length, an aperture value and an in-focus object distance.

* * * * *